May 7, 1957 J. C. KARLSON 2,791,742
MAGNETIC AMPLIFIER
Filed May 21, 1953 2 Sheets-Sheet 1

INVENTOR.
JOHN C. KARLSON
BY
Oscar B Brumback
ATTORNEY

May 7, 1957 J. C. KARLSON 2,791,742

MAGNETIC AMPLIFIER

Filed May 21, 1953 2 Sheets-Sheet 2

INVENTOR.
JOHN C. KARLSON
BY
Oscar B. Brumback
ATTORNEY

United States Patent Office 2,791,742

Patented May 7, 1957

2,791,742

MAGNETIC AMPLIFIER

John C. Karlson, Brooklyn, N. Y., assignor to Bendix Aviation Corporation, Teterboro, N. J., a corporation of Delaware Application May 21, 1953, Serial No. 356,401

18 Claims. (Cl. 323—56)

This invention relates generally to control systems and more particularly to control systems utilizing magnetic amplifiers.

A control system is comprised, generally, of a source of control signals, an amplifier for amplifying the low level of the control signal to a level sufficient to operate a servomotor, and a servomotor which transforms the electrical energy into mechanical motion. When the servosystems are subjected to adverse operating conditions, magnetic amplifiers are used because of their greater reliability. Since these servosystems generally operate from an error signal that is reversible as to phase, a phase sensitive device must be provided for the magnetic amplifier. Heretofore, this has involved a number of electronic tubes which is a disadvantage. The number of electronic tubes involved in an amplifier design decreases its reliability since its effective life depends upon the marginal life of the vacuum tubes. Also, the housing and sealing of the amplifier is difficult when a number of vacuum tubes were employed.

An object of the present invention, therefore, is to provide a novel amplifier utilizing a minimum of vacuum tubes.

Another object is to provide an amplifier that is compact in construction and small in size for the amplification factor involved.

A further object of the invention is to provide a magnetic amplifier having a novel phase sensitive element.

A still further object is to provide a servosystem in which the counterelectromotive force developed by the servomotor may be used for the dynamic braking of the motor.

Other objects are to provide a novel amplifier which has a minimum of component parts thereby lowering production cost, which is highly consolidated and small in physical size for the amplification involved, and which has few possibilities of failure in operation.

The foregoing and other objects and advantages of the present invention will appear more fully hereinafter from a consideration of the detailed description which follows, taken together with the accompanying drawing wherein one embodiment of the invention is illustrated by way of example. It is to be expressly understood, however, that the drawing is for the purpose of illustration and description only, and is not intended as a definition of the limits of the invention.

In the drawings wherein like parts are numbered alike:

Figure 1:
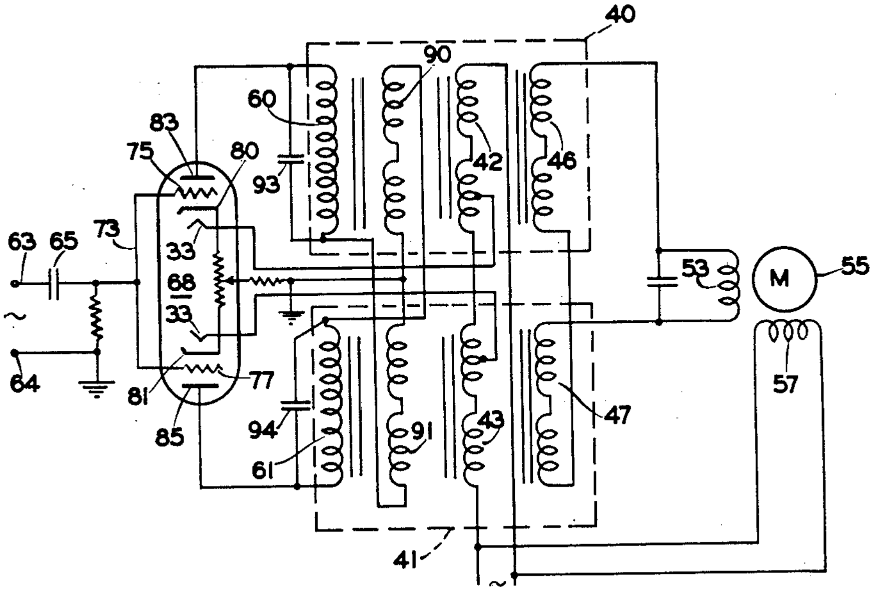
Figure 1 shows a complete schematic wiring diagram for a system utilizing a novel amplifier in which a single vacuum tube is used.

In Figure 1 of the drawings, the novel magnetic amplifier is shown as being comprised of saturable reactors 40 and 41 which may be of the three-legged, stacked-core type although the invention is not limited to this type. These saturable reactors are adjustable inductors in which the output is adjusted by control magnetomotive forces applied to the cores. The output circuit is an alternating current circuit which, except for the magnetic coupling, is substantially separate from the direct current control circuit.

Reactors 40 and 41 are in the nature of two transformers, each having a primary winding and a secondary winding wound on its outer legs. Primary windings 42 and 43 are energized by an alternating current and are connected in series aiding. Secondary windings 46 and 47 are connected in series opposition and form a closed circuit with the variable phase winding 53 of a servomotor 55 whose fixed phase winding 57 is continuously energized.

When the flux density of the cores of the two saturable transformers is alike, the two voltages induced in secondary windings 46 and 47 are equal in amplitude; but, since they are connected in series opposed, the two voltages are opposite in phase. With the two equal voltages opposing each other, no resulting current flows through the variable phase field 53 of servomotor 55.

Should one of the cores of transformers 40, 41 be energized with direct current flux more than the other, the voltage induced in the secondary winding of that transformer is reduced correspondingly and the opposing voltage in the secondary winding of the other transformer will prevail. The result is a flow of current through the variable phase field winding 53 of motor 55. Whether the motor rotates in a clockwise or counterclockwise direction depends upon the phase of this current through variable phase winding 53 with respect to the phase of the current in fixed phase winding 57. Thus, the direction of rotation depends upon whether transformer 40 or 41 is energized with the direct current flux.

Flux energization or magnetization of transformers 40, 41 is accomplished by direct current control windings wound on the center legs of the transformers. Normally these windings are traversed by sufficient direct current to magnetize the cores equally and to a point X on the magnetization curve, Figure 5.

The control signal from a suitable source (not shown) applied to terminals 63 and 64 and impressed across a blocking condenser 65 may be reversible in phase. To enable servomotor 55 to reverse with the phase of the signal, a phase sensitive means must be provided so that the flow of direct current in control windings 60 and 61 may be selectively varied.

The foregoing elements are conventional and are similarly designated in Figures 1, 2, 3 and 4.

In Figure 1, a conventional twin triode vacuum tube 68 is the phase sensitive element. Its grids 75 and 77 are connected together by lead 73 to receive the control signal; its cathodes 80 and 81 are grounded; its plates 83 and 85 are connected to control windings 60 and 61, respectively; and its heater 33 may be energized from primary windings 42 and 43 for further compactness in design.

To form a plate supply, another secondary winding is wound on the outer legs of each transformer; a secondary winding 90 on transformer 40 and a second winding 91 on transformer 41. One terminal of each of these windings is grounded and the other terminal is connected to a plate of tube 68. This is a cross connection; winding 90 of transformer 40 being connected through control winding 61 in transformer 41 to plate 85 and secondary winding 91 in transformer 41 through control winding 60 in transformer 40 to plate 83. Capacitors 93 and 94 permit energy to be supplied to plates 83 and 85 despite the high impedance of windings 60 and 61. Since the plate supply is taken from the opposite ends of the secondary windings, the instantaneous voltage on plate 83 is opposite in phase to the voltage on plate 85. The phase of the control signal on the grids 75 and 77, however, will be the same since the grids are tied together by lead 73.

Figure 5:
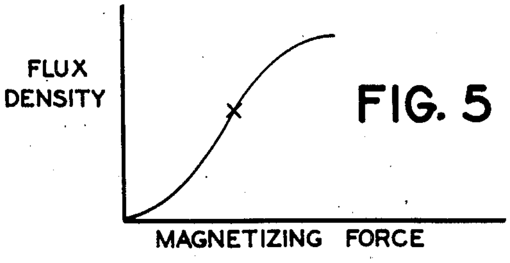
Figure 5 shows a typical magnetization curve for a magnetic amplifier.

When no signal is present on lead 73, the two voltages induced in each of the secondary windings 90 and 91 are equal; the bias on tube 68 is such that the resulting current flow through each triode circuit magnetizes the cores of transformers 40 and 41 equally and to a position X on the linear portion of their magnetization curve, Figure 5. The two equal voltages induced in secondary windings 46 and 47 oppose each other in the same circuit, so no resultant current flows to the variable phase winding 53 of motor 55.

Upon the application of a signal to lead 73, the triode section whose plate 83 or 85 has a voltage applied thereto in phase with the signal will experience a rise in plate current. The core of the transformer whose control winding is fed by this plate current will be magnetized further. This reduces the voltage induced in the secondary windings of that transformer correspondingly. In contrast, the other triode section will experience a decrease in plate current. The core of the transformer whose control winding is fed by this triode will become less magnetized. The voltage induced in the secondary windings in one transformer will be decreased and in the other will be increased correspondingly. This effect will be further enhanced because the triode plates are cross fed, the conducting triode being subject to an increasing plate voltage and the non-conducting triode to a decreasing plate voltage.

The magnetization being reduced in one transformer and increased in the other upsets the balanced relationship of the voltages in secondary windings 46 and 47 of the output circuit, resulting in a net current flow through the circuit and the variable phase winding 53 of motor 50. The direction of rotation of the motor will thus depend upon which plate is conductive; and this, in turn, depends upon the phase of the signal at terminals 63, 64.

When the variable phase voltage is in the process of decay due to a lowered or zero signal across terminals 63 and 64, the inertia stored as kinetic energy in the moving parts tends to keep the motor rotating. Since winding 57 is energized, the motor now acts as a generator and a counterelectromotive force is induced in the variable phase winding 53. This appears in windings 46, 47. Since this counterelectromotive force is in opposition to the voltage which caused the rotation of the motor, its nature is such as to aid the recovery of the more magnetized transformer, bringing about a rise in the plate voltage of the non-conducting triode and damping the operation of the induction motor.

Figure 2:
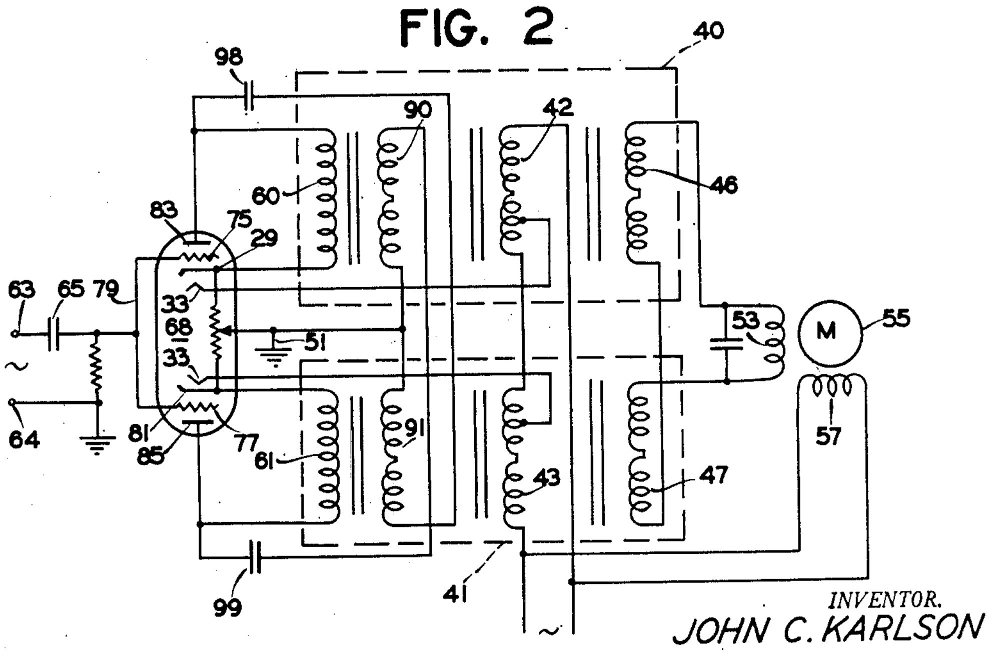
Figure 2 illustrates an embodiment of Figure 1 in which the plate and cathode of each triode section is connected directly across the control coil with which it is associated.

In Figure 2 an embodiment is shown in which secondary windings 90, 91 are connected through blocking condensers 98 and 99 directly with the plates 83, 85 of triode 68 and the control windings 60, 61 are connected with the plates 83, 85 and cathodes 80, 81 of the twin triode; control winding 60 being connected to plate 83 and cathode 80 and control winding 61 being connected to plate 85 and cathode 81. Each triode now acts as a grid controlled rectifier and operates at a lower plate potential than is required in Figure 1 where the control coil is in series with the supply. The speed of response is also enhanced since the condenser is in series with the plate circuit instead of in shunt across the control coil as in Figure 1. Condensers 98 and 99 also limit the extent to which either triode may be driven by the signal source.

When a phase sensitive amplifier such as the foregoing is used, a close balance must be maintained between each of the triode sections so as to introduce as little differential error as possible into the transformers. The use of a vacuum tube may be a further disadvantage when it comes to housing and sealing the units.

Figure 3:
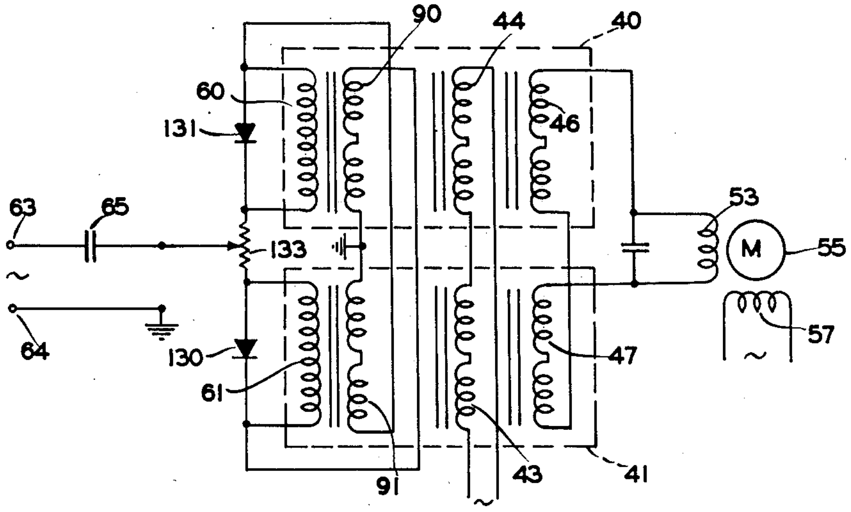
Figure 3 shows a complete schematic wiring diagram for a servosystem wherein no vacuum tubes are used in the novel amplifier.
Figure 4:
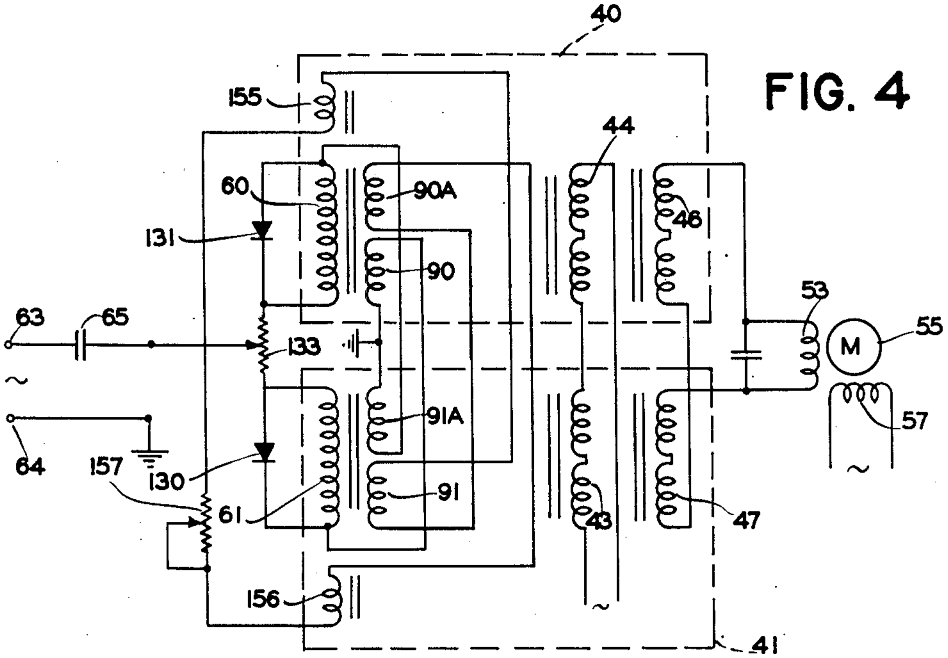
Figure 4 illustrates an embodiment of the novel amplifier of Figure 3 in which a feedback winding is used.

Figures 3 and 4 illustrate embodiments of the novel amplifier in which the phase sensing circuit uses no vacuum tubes. In the circuit of Fig. 3, secondary winding 90 of transformer 40 has one terminal grounded and the other terminal connected to a rectifier 130 which may be of the germanium type. Secondary winding 91 of transformer 41 is similarly grounded at one terminal and connected at its other terminal to a rectifier 131. Control winding 60 of transformer 40 is connected across rectifier 131, and control winding 61 of transformer 41 is connected across rectifier 130. These rectifiers have their polarities in the same direction and are connected by a resistor 133. The control signal applied to terminals 63 and 64 is impressed through blocking condenser 65 to the wiper of resistor 133.

With no signal across terminals 63 and 64, equal and opposite voltages are induced in the secondary windings 46 and 47 of the output circuit; and the net signal to variable phase winding 53 of servomotor 55 is zero. The sum of the voltages which are also induced in secondary windings 90 and 91 cause reference current to flow through rectifiers 130 and 131 and through control windings 60 and 61 to magnetize the transformers equally to a position X on the linear portion of the magnetization curve (Figure 5).

When an alternating current signal is impressed across terminals 63 and 64, it will aid the voltage flowing in the reference circuit of one transformer and subtract from the voltage flowing in the other. Accordingly, one rectifier will experience an increase in current flow and the other a decrease, and the flow of current through control winding 60 or 61 will be increased or decreased depending upon the phase of the signal. The transformer whose control winding has more current flowing in it will become magnetized to a greater extent, and the transformer whose control winding has less current flowing in it will become magnetized to a lesser extent. The coupling between the primary windings and the secondary windings will be different for each transformer; the balanced relationship of the voltages in secondary windings 46 and 47 will be upset, and the resulting net voltage will operate motor 55 by energizing its variable phase winding 53.

Further, the sensitivity of the magnetic amplifier is enhanced due to the cross feed; the rectifier that is conducting receiving increased voltage from the secondary supply winding which is in the other transformer while the secondary supply winding for the transformer that is non-conducting will be receiving less voltage from its reference winding.

Figure 4 is an embodiment of an amplifier such as shown in Figure 3 in which a further feedback is provided. To this end, the secondary windings in Figure 3 wound on the outer legs of the two transformers 40 and 41 are each formed as two windings. Windings 90 and 91 are connected to rectifier 130 and 131 in a manner similar to the windings in Figure 3. Windings 90A and 91A are connected to windings 155 and 156 which are wound on the center leg of the transformers in conjunction with the control windings 60 and 61. A variable resistor 157 controls the amount of current flow through the latter circuit. These feedback windings 155 and 156 provide an additional current through the transformers to keep the transformers magnetized to a point X on the linear portion of the magnetization curve.

The foregoing has presented a control system using a novel magnetic amplifier in which vacuum tubes have been kept at a minimum or have been eliminated to increase the reliability and durability of the amplifier. Also the amplifier utilizes the counterelectromotive force generated by the servomotor to provide a dynamic braking action for the motor. The amplifier utilizing no vacuum tubes eliminates the need for providing for aging factors as is necessary in vacuum tube installations. The amplifier is compact in construction and is small in size for the amplification factor involved.

Although several embodiments of the invention have been illustrated and described in detail, it is to be expressly understood that the invention is not limited thereto. Various changes may also be made in the design and arrangement of the parts without departing from the spirit and scope of the invention as will now be understood by those skilled in the art. For a definition of the limits of the invention, reference will be had primarily to the appended claims.

I claim:

1. A magnetic amplifier comprising a pair of saturable transformers, each having a primary winding, a pair of secondary windings and a control winding, said primary and secondary windings being inductively coupled so that a voltage is induced in said secondary windings when said primary winding is energized, cross connection means for each transformer for connecting a control winding of one transformer with one secondary winding of the other transformer including rectifier means for changing the alternating current of said one secondary winding to direct current for the control winding, and means adapted to receive a control signal for differentially varying the direct current in the control windings whereby the induction coupling of the primary and said secondary windings is differentially varied and an output is produced by said other secondary winding.

2. A magnetic amplifier comprising a pair of saturable transformers, each transformer having a primary winding, a first secondary winding, a second secondary winding, a third secondary winding, and a control winding, said primary and secondary windings being inductively coupled whereby a voltage is induced in said secondary windings when said primary winding is energized, cross connection means for each transformer for connecting a control winding of one transformer with a first secondary winding of the other transformer including rectifying means for changing the alternating current induced in said first secondary winding to direct current for the control winding, and means adapted to receive a control signal for differentially varying the direct current in the control windings whereby the induction coupling of the primary and secondary windings is differentially varied, said second secondary windings being adapted to be connected to a load and said third secondary windings forming a feedback circuit for operation with said control windings.

3. A magnetic amplifier comprising a pair of saturable transformers, each transformer having a primary winding, a pair of secondary windings, and a control winding, said primary and secondary windings being inductively coupled whereby a voltage is induced in said secondary windings when said primary winding is energized, cross connection means for each transformer for connecting a control winding of one transformer with one secondary winding of the other transformer including rectifier means for changing the alternating current induced in one secondary winding to direct current for the control winding, means connecting said rectifying means together with their polarities in the same direction, and means for impressing a control signal on said last named means for differentially varying the direct current in the control windings whereby the induction coupling of the primary and secondary windings is differentially varied, and means for connecting said other secondary windings to a load.

4. A magnetic amplifier comprising a pair of saturable transformers, each transformer having a primary winding, a pair of secondary windings, and a control winding, said primary and secondary windings being inductively coupled whereby a voltage is induced in said secondary windings when said primary winding is energized, cross connection means for each transformer for connecting a control winding of one transformer with one of said secondary windings of the other transformer including a pair of thermionic means for changing the alternating current of said secondary windings to direct current for the control windings, and means for impressing a control signal on said thermionic means for differentially varying the direct current in the control windings whereby the induction coupling of the primary and secondary windings of the transformers is differentially varied.

5. A magnetic amplifier comprising a pair of saturable transformers, each having a primary winding, a pair of secondary windings, and a control winding, said primary and secondary windings being inductively coupled whereby a voltage is induced in said secondary windings when said primary winding is energized, cross connection means for each transformer for connecting a control winding of one transformer with one of the secondary windings of the other transformer including thermionic means for changing the alternating current of the secondary winding to direct current for the control windings, said thermionic means having anode, cathode and grid elements, said anodes and said cathodes being connected to said last mentioned secondary windings, and means for impressing a control signal on said grids for differentially varying the direct current in the control windings whereby the induction coupling of the primary and secondary windings of the transformer is differentially varied.

6. A magnetic amplifier comprising a pair of normally balanced saturable transformers, each having a control winding adapted to be energized by direct current, a primary winding adapted to be energized by a source of alternating current and a secondary winding adapted to have a current induced therein by said primary winding and cross connection means for each transformer for connecting the control winding of one transformer with the secondary winding of the other transformer including means for changing the alternating current of said secondary winding to direct current for the control winding, and means for differentially varying the direct current in said control windings to unbalance said transformers.

7. A magnetic amplifier comprising a pair of normally balanced saturable transformers, each having a control winding adapted to be energized by direct current, a primary winding adapted to be energized by a source of alternating current and a secondary winding adapted to have a current induced therein by said primary winding, and cross connection means for each transformer for connecting the control winding of one transformer with the secondary winding of the other transformer, said cross connection means including rectifiers for changing the alternating current of the secondary winding to direct current for the control winding, and means for differentially varying the direct current in said control windings for unbalancing said transformers.

8. A magnetic amplifier comprising a pair of normally balanced saturable transformers, each having a control winding adapted to be energized by direct current, a primary winding adapted to be energized by a source of alternating current and a secondary winding adapted to have a current induced therein by said primary winding, and cross connection means for each transformer for connecting the control winding of one transformer with the secondary winding of the other transformer including rectifier means for changing the alternating current of the secondary windings to direct current for the control windings, connecting means for connecting said rectifier means together so that the rectifier means have their polarities in the same direction, and means for applying a control signal to said connecting means for differentially varying the direct current in each control winding to unbalance said transformers.

9. A magnetic amplifier comprising a pair of normally balanced saturable transformers, each having a control winding adapted to be energized by direct current, a primary winding adapted to be energized by a source of alternating current, and a secondary winding adapted to have a current induced therein by said primary winding, and cross connection means for each transformer for connecting the control winding of one transformer with the secondary winding of the other transformer, said cross connection means including thermionic means for changing the alternating current of the secondary winding to direct current for the control winding, said thermionic means having grid plate and cathode elements, the plate of one electron element being connected through said control winding of one transformer in series with said secondary winding of said other transformer, and means for applying a control signal to said grids to differentially vary the direct current in said control windings to unbalance said transformers.

10. A magnetic amplifier comprising a pair of saturable transformers, each having a control winding and means comprising cross-connection means for energizing the control winding of one transformer from the other transformer, and means for differentially varying the energization of the control windings.

11. A magnetic amplifier comprising a pair of saturable transformers, each having a control winding and means for energizing the control winding of one transformer from the other transformer, each of said last named means including a rectifier, means for connecting said rectifiers together so that their polarities are in the same direction, and means for applying a control signal to said connecting means for differentially varying the energization of said control windings.

12. A magnetic amplifier comprising a pair of normally balanced saturable transformers, each transformer having a control winding and means for energizing the control winding of one transformer from the other transformer, each of said last named means including a thermionic means having anode, cathode, and grid elements with the anode connected through the control winding of one transformer to the other transformer and the cathode connected to the other transformer to complete the circuit, and means for impressing a control signal on the grids to differentially vary the energization of the control windings.

13. A magnetic amplifier comprising a pair of normally balanced saturable transformers, each having a control winding and means for energizing the control winding of one transformer from the other transformer, each of said last named means including a thermionic means having anode, cathode, and grid elements with the control winding of one transformer connected to said anode and cathode in parallel with the energization for said anode from the other transformer, and means for applying a control signal to said grids for differentially varying the energization of said control windings.

14. An amplifier comprising a pair of saturable transformers, each having a primary winding, first and second secondary windings, and a control winding, said primary and secondary windings being inductively coupled so that a voltage is induced in said secondary windings from said primary winding, means energizing said primary windings with alternating current, means connecting the first secondary windings of said pair of transformers into a normally balanced circuit, whereby the resulting output of said circuit is normally zero, and cross connection means for supplying the control winding of each transformer with excitation derived from the voltage induced in the second secondary winding of the other transformer.

15. An amplifier comprising a pair of saturable transformers, each having a primary winding, first and second secondary windings, and a control winding, said primary and secondary windings being inductively coupled so that a voltage is induced in said secondary windings from said primary winding, means energizing said primary windings with alternating current, means connecting the first secondary windings of said pair of transformers into a normally balanced circuit, whereby the resulting output of said circuit is normally zero, and cross connection means for supplying the control winding of each transformer with excitation derived from the voltage induced in the second secondary winding of the other transformer, said cross connection including means for changing the alternating current from said second secondary windings to direct current for said control windings.

16. An amplifier comprising a pair of saturable transformers, each having a primary winding, first and second secondary windings, and a control winding, said primary and secondary windings being inductively coupled so that a voltage is induced in said secondary windings from said primary winding, means energizing said primary windings with alternating current, means connecting the first secondary windings of said pair of transformers into a normally balanced circuit, whereby the resulting output of said circuit is normally zero, and cross connection means for supplying the control winding of each transformer with excitation derived from the voltage induced in the second secondary winding of the other transformer, said cross connection including means for changing the alternating current from said second secondary windings to direct current for said control windings, said last named means being adapted to differentially vary the direct current in said control windings in response to control signals, whereby said inductive coupling between the primary and secondary windings is differentially varied and an output is developed at said circuit.

17. An amplifier comprising first and second saturable transformers, each having a primary winding, first and second secondary windings, and a control winding, said primary and secondary windings being inductively coupled so that a voltage is induced in said secondary windings from said primary winding, means energizing said primary windings with alternating current, means connecting the first secondary windings of said first and second transformers into a normally balanced circuit, whereby the resulting output of said balanced circuit is normally zero, and cross connection means for supplying the control winding of each transformer with excitation derived from the voltage induced in the second secondary winding of the other transformer including a pair of vacuum tubes having anode, cathode, and grid electrodes, the circuit between the anode and cathode of one vacuum tube including the control winding of said first transformer and the second secondary winding of said second transformer, and the circuit between the anode and cathode of the other vacuum tube including the control winding of said second transformer and the second secondary winding of said first transformer, and means for supplying a control signal to the grids of said tubes, whereby the excitation of said control windings is varied differentially and whereby the differential voltage induced in said second secondary winding of one transformer influences the saturation of the core of the other transformer.

18. An amplifier comprising a pair of saturable transformers, each having a primary winding, first and second secondary windings, and a control winding, said primary and secondary windings being inductively coupled so that a voltage is induced in said secondary windings from said primary winding, means energizing said primary windings with alternating current, means connecting said first secondary windings of said pair of transformers into a normally balanced circuit, whereby the resulting output of said balanced circuit is normally zero, and cross connection means including a pair of thermionic tubes for converting the alternating current of said second secondary winding of each transformer into direct current for the control winding of the other transformer, and means for varying the direct current to each control winding differentially in response to a control signal.

References Cited in the file of this patent

UNITED STATES PATENTS

| | | |
|---|---|---|
| 2,435,926 | Krupnick | Feb. 10, 1948 |
| 2,450,084 | Emerson | Sept. 28, 1948 |
| 2,503,039 | Glass | Apr. 4, 1950 |